US010776777B1

(12) United States Patent
Maeng (10) Patent No.: US 10,776,777 B1
(45) Date of Patent: Sep. 15, 2020

(54) CONSOLIDATING APPLICATION ACCESS IN A MOBILE WALLET

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 468 days.

(21) Appl. No.: 15/669,460

(22) Filed: Aug. 4, 2017

(51) Int. Cl.
*G06Q 40/00* (2012.01)
*G06Q 20/36* (2012.01)
*G06Q 20/40* (2012.01)

(52) U.S. Cl.
CPC ....... *G06Q 20/363* (2013.01); *G06Q 20/4014* (2013.01)

(58) Field of Classification Search
CPC ..................................................... G06Q 40/00
See application file for complete search history.

(56) References Cited

U.S. PATENT DOCUMENTS

| 4,893,338 | A | 1/1990 | Pastor |
| 5,872,844 | A | 2/1999 | Yacobi |
| 5,878,138 | A | 3/1999 | Yacobi |
| 6,250,557 | B1 | 6/2001 | Forslund et al. |
| 7,118,027 | B2 | 10/2006 | Sussman |
| 7,120,609 | B1 | 10/2006 | Kerkdijk |
| 7,207,480 | B1 | 4/2007 | Geddes |
| RE40,444 | E | 7/2008 | Linehan |
| 7,702,898 | B2 | 4/2010 | Tan |
| 7,822,688 | B2 | 10/2010 | Labrou et al. |
| 8,041,338 | B2 | 10/2011 | Chen et al. |
| 8,291,065 | B2 | 10/2012 | Goodman et al. |
| 8,423,462 | B1 | 4/2013 | Amacker et al. |
| 8,510,220 | B2 * | 8/2013 | Rackley, III ........... G06Q 40/00 705/39 |
| 8,577,803 | B2 | 11/2013 | Chatterjee et al. |

(Continued)

FOREIGN PATENT DOCUMENTS

CN 102693378 A 9/2012

OTHER PUBLICATIONS

Terri Bradford, Where Social Networks, Payments and Banking Intersect, Dec. 2012, Federal Reserve Bank of Kansas City, web, 2-5 (Year: 2012).*

(Continued)

*Primary Examiner* — I Jung Liu
(74) *Attorney, Agent, or Firm* — Schwegman Lundberg & Woessner, P.A.

(57) ABSTRACT

Various examples are directed to systems and methods for consolidation application access within a master mobile wallet. The master wallet may be activated using a master password. The master wallet may display a menu of the one or more mobile wallet applications and receive a selection of a particular mobile wallet application to add to the master mobile wallet application. The master wallet may receive a selection to use the master password for activating the particular mobile wallet application. After, the master wallet may receive a selection to activate an added mobile wallet application. The master wallet may activate the added mobile wallet application without requiring user input of an individual password for the particular mobile wallet application during the activating.

20 Claims, 9 Drawing Sheets

(56) References Cited

U.S. PATENT DOCUMENTS

| | | | |
|---|---|---|---|
| 8,583,926 B1 | 11/2013 | Benson | |
| 8,595,502 B2 | 11/2013 | Saito | |
| 8,732,022 B2 | 5/2014 | White | |
| 8,739,267 B2 | 5/2014 | Le Rouzic et al. | |
| 8,761,397 B1 | 6/2014 | Wright | |
| 8,769,260 B1 | 7/2014 | Kwan et al. | |
| 8,839,369 B1 | 9/2014 | Dai et al. | |
| 8,849,075 B2 | 9/2014 | Painter et al. | |
| 8,880,896 B1 | 11/2014 | Elliott | |
| 8,903,093 B2 | 12/2014 | Kim et al. | |
| 9,208,488 B2 | 12/2015 | Liberty | |
| 9,246,672 B2 | 1/2016 | Smith | |
| 9,317,018 B2 | 4/2016 | Spodak et al. | |
| 9,325,696 B1 | 4/2016 | Balfanz et al. | |
| 9,355,186 B2 | 5/2016 | Khanna et al. | |
| 9,386,012 B2 | 7/2016 | Nichols et al. | |
| 9,704,143 B2 | 7/2017 | Walker et al. | |
| 9,721,147 B1 | 8/2017 | Kapczynski | |
| 9,734,345 B2 | 8/2017 | Spodak et al. | |
| 9,858,572 B2 | 1/2018 | Brickell et al. | |
| 9,898,740 B2 | 2/2018 | Weller | |
| 9,904,800 B2 | 2/2018 | Spodak et al. | |
| 9,940,618 B2 | 4/2018 | Kang | |
| 2001/0007983 A1 | 7/2001 | Lee | |
| 2004/0158746 A1 | 8/2004 | Hu et al. | |
| 2005/0114367 A1 | 5/2005 | Serebrennikov | |
| 2006/0159260 A1 | 7/2006 | Pereira et al. | |
| 2006/0165060 A1 | 7/2006 | Dua | |
| 2007/0094727 A1 | 4/2007 | Singh | |
| 2007/0125838 A1 | 6/2007 | Law et al. | |
| 2007/0125840 A1 | 6/2007 | Law et al. | |
| 2008/0022089 A1 | 1/2008 | Leedom | |
| 2008/0208743 A1 | 8/2008 | Arthur et al. | |
| 2009/0125429 A1 | 5/2009 | Takayama | |
| 2010/0024015 A1 | 1/2010 | Hardt | |
| 2010/0191602 A1 | 7/2010 | Mikkelsen et al. | |
| 2011/0061012 A1 | 3/2011 | Lim et al. | |
| 2012/0005078 A1 | 1/2012 | Pitroda | |
| 2012/0036067 A1 | 2/2012 | Lee et al. | |
| 2012/0072350 A1* | 3/2012 | Goldthwaite | G06K 7/0004 |
| | | | 705/44 |
| 2012/0136732 A1 | 5/2012 | McMillen et al. | |
| 2012/0159149 A1 | 6/2012 | Martin et al. | |
| 2012/0174007 A1 | 7/2012 | Lee et al. | |
| 2012/0198174 A1 | 8/2012 | Nellans et al. | |
| 2012/0210041 A1 | 8/2012 | Flynn et al. | |
| 2012/0221774 A1 | 8/2012 | Atkisson et al. | |
| 2012/0239578 A1 | 9/2012 | Kang et al. | |
| 2012/0240203 A1 | 9/2012 | Kling | |
| 2012/0290449 A1 | 11/2012 | Mullen et al. | |
| 2013/0275307 A1 | 10/2013 | Khan | |
| 2013/0275656 A1 | 10/2013 | Talagala et al. | |
| 2013/0290316 A1 | 10/2013 | Bhatnagar et al. | |
| 2014/0032394 A1 | 1/2014 | Liberty et al. | |
| 2014/0040147 A1 | 2/2014 | Varadarajan et al. | |
| 2014/0058938 A1 | 2/2014 | Mcclung, III | |
| 2014/0129357 A1* | 5/2014 | Goodwin | G06Q 20/20 |
| | | | 705/16 |
| 2014/0188719 A1 | 7/2014 | Poornachandran et al. | |
| 2014/0279566 A1 | 9/2014 | Verma et al. | |
| 2014/0337230 A1 | 11/2014 | Bacastow | |
| 2014/0372298 A1 | 12/2014 | Singh et al. | |
| 2014/0372299 A1 | 12/2014 | Singh et al. | |
| 2015/0006377 A1 | 1/2015 | Kang | |
| 2015/0019567 A1* | 1/2015 | Li | G06Q 30/00 |
| | | | 707/748 |
| 2015/0067833 A1 | 3/2015 | Verma et al. | |
| 2015/0089438 A1 | 3/2015 | Wu et al. | |
| 2015/0206210 A1 | 7/2015 | Liberty et al. | |
| 2015/0254640 A1 | 9/2015 | Cassano et al. | |
| 2015/0332395 A1 | 11/2015 | Walker et al. | |
| 2016/0012465 A1 | 1/2016 | Sharp | |
| 2016/0019542 A1 | 1/2016 | Eischen | |
| 2016/0028550 A1 | 1/2016 | Gaddam et al. | |
| 2016/0055483 A1 | 2/2016 | Liberty | |
| 2016/0092696 A1 | 3/2016 | Guglani et al. | |
| 2016/0117660 A1 | 4/2016 | Prakash et al. | |
| 2016/0162882 A1 | 6/2016 | McClung | |
| 2016/0358199 A1* | 12/2016 | Van Os | G06Q 20/40 |
| 2017/0032370 A1 | 2/2017 | Beltramino et al. | |
| 2017/0243315 A1 | 8/2017 | Ellerstein | |

OTHER PUBLICATIONS

U.S. Appl. No. 15/264,531, filed Sep. 13, 2016, Secure Digital Communications.

"Apple Pay", [Online]. Retrieved from the Internet: <URL: http://www.apple.com/apple-pay/, (Accessed Mar. 31, 2016), 8 pgs.

"U.S. Appl. No. 15/264,532, Corrected Notice of Alllowance dated May 2, 2018", 2 pgs.

"U.S. Appl. No. 15/264,532, Examiner Interview Summary dated Apr. 23, 2018", 2 pgs.

"U.S. Appl. No. 15/264,532, Notice of Allowance dated Apr. 23, 2018", 16 pgs.

"U.S. Appl. No. 15/264,540, Notice of Allowance dated Apr. 17, 2018", 2 pgs.

"U.S. Appl. No. 15/394,526, Examiner Interview Summary dated Apr. 20, 2018", 2 pgs.

"U.S. Appl. No. 15/394,526, Notice of Alllowance dated Apr. 20, 2018", 17 pgs.

"Business Description", SET Secure Electronic Transaction Specification, (May 1997), 80 pgs.

"Electronic Commerce Modeling Language", RFC 4112—Version 2 Specification, (Jun. 2005), 36 pgs.

"Formal Protocol Definition", SET Secure Electronic Transaction Specification, (May 1997), 262 pgs.

"How email works (MTA, MDA, MUA)", [Online]. Retrieved from the Internet: <URL: kioskea.net> http://ccm.net/contents/116-how-email-works-mta-mda-mua, (Jun. 2014), 2 pgs.

"How EMV (Chip & PIN) Works—Transaction Flow Chart", EMV Level 2 Kernels, [Online]. [Accessed Feb. 28, 2019]. Retrieved from the Internet: <URL: https://www.level2kernel.com/flow-chart.html>, 3 pgs.

"Online E Wallet System with Decentralized Credential Keepers", Mobile Networks and Applications 8, (2003), 87-99.

"Programmers Guide", SET Secure Electronic Transaction Specification, (May 1997), 629 pgs.

"The 'mailto' URI Scheme", RFC 6068, (Oct. 2010), 17 pgs.

"Uniform Resource Identifier", RFC3986, (Jan. 2005), 61 pgs.

"Why 6 confirmations?", Bitcoin, [Online]. [Accessed May 23, 2017]. Retrieved from the Internet: <URL: https://www.reddit.com/r/Bitcoin/comments/1cqyb1/why_6_confirmations/ >, 4 pgs.

Crispin, M., "internet Message Access Protocol", Version 4rev1—Network Working Group RFC3501, (Mar. 2003), 108 pgs.

Dove, Jackie, "Mobile Wallets: Apple Pay vs Samsung Pay vs Google Pay", Tom's Guide Updated Jan. 17, 2018, [Online]. [Accessed Feb. 28, 2019]. Retrieved from the Internet: <URL: https://www.tomsguide.com/us/mobile-wallet-guide,news-20666.html>, 8 pgs.

Egan, Matt, "What is NFC? Uses of NFC | How to use NFC on your smartphone", Tech Advisor, [Online]. [Accessed Feb. 28, 2019]. Retrieved from the Internet: <URL: https://www.techadvisor.co.uk/how-to/mobile-phone/what-is-nfc-how-nfc-works-what-it-does-3472879/>, (May 12, 2015), 5 pgs.

Geuss, Megan, "How Apple Pay and Google Wallet actually work", [Online]. Retrieved from the Internet: <URL: http://arstechnica.com/gadgets/2014/10/how-mobile-payments-really-work/1/, (Oct. 29, 2014), 5 pgs.

Geuss, Megan, "Why Apple Pay could succeed where others have had underwhelming results", [Online]. Retrieved from the Internet: <URL: http://arstechnica.com/apple/2014/09/why-apple-pay-could-succeed-where-others-have-had-underwhelming-results/, (Sep. 14, 2014), 6 pgs.

Kar, Ian, "Here's How the Security Behind Apple Pay Will Really Work", [Online]. Retrieved from the Internet: <URL: http://bankinnovation.net/2014/09/heres-how-the-security-behind-apple-pay-will-really-work/, (Sep. 12, 2014), 5 pgs.

(56) References Cited

OTHER PUBLICATIONS

Klensin, J., "Simple Mail Transfer Protocol", RFC5321, (Oct. 2008), 96 pgs.

Labrou, Yannis, et al., "Wireless Wallet", The First Annual International Conference on Mobile and Ubiquitous Systems: Networking and Services, 2004. IEEE, (2004), 10 pgs.

Mallat, Niina, et al., "Mobile Banking Service", Communications of the ACM, vol. 47, No. 5, (May 2004), 42-46.

Myers, J., et al., "Post Office Protocol—Version 3 degree", RFC 1939, (May 1996), 24 pgs.

Zhao, Hao, et al., "The Concept of Secure Mobile Wallet", Internet Security, IEEE Xplore, 2011 World Congress, Feb. 21-23, 2011, (2011), 5 pgs.

\* cited by examiner

CONSOLIDATING APPLICATION ACCESS IN A MOBILE WALLET

TECHNICAL FIELD

Embodiments described herein generally relate to mobile (e.g., digital) wallets and, for example and without limitation, consolidating application access in a mobile wallet.

BACKGROUND

Mobile wallets may store payment elements that allow consumers to make payments for products and services with mobile computing devices instead of cash, credit cards or checks. Mobile wallets may also store non-payment elements such as tickets and identification cards.

DRAWINGS

In the drawings, which are not necessarily drawn to scale, like numerals may describe similar components in different views. Like numerals having different letter suffixes may represent different instances of similar components.

The drawings illustrate generally, by way of example, but not by way of limitation, various embodiments discussed in the present document.

DETAILED DESCRIPTION

A mobile wallet (also known as an electronic or digital wallet) refers to an application program executed by one or more computing devices (e.g., mobile devices such as a smartphone) and corresponding device memory which store and manage digital representations of elements (or items) typically found in a user's wallet or purse. These elements may comprise payment elements and non-payment elements. Payment elements are items which may be used in a financial transaction. Example payment elements managed by the digital wallet include digital representations of transaction cards, financial information, discount coupons, gift cards, subway passes, movie tickets, and so on. Example non-payment elements include digital representations of driver's licenses, passports, student ids, library cards, membership cards, insurance cards, and so on.

A mobile wallet application may allow an individual to use the stored information to pay for items (either in person or in e-commerce transactions), provide for identification (e.g., producing a driver's license), transfer money to others, access bank accounts, collect discount coupons, submit subway passes, and the like. Example mobile wallets include but are not limited to WELLS FARGO WALLET™, CITI PAY™, STARBUCKS® APP, WALMART PAY™, APPLE PAY™, ANDROID PAY™, GOOGLE WALLET™, SAMSUNG PAY™, GYFT APP™, and peer-to-peer payment apps such as VENMO®, SQUARE CASH™, and TILT APP™.

Figure 4:
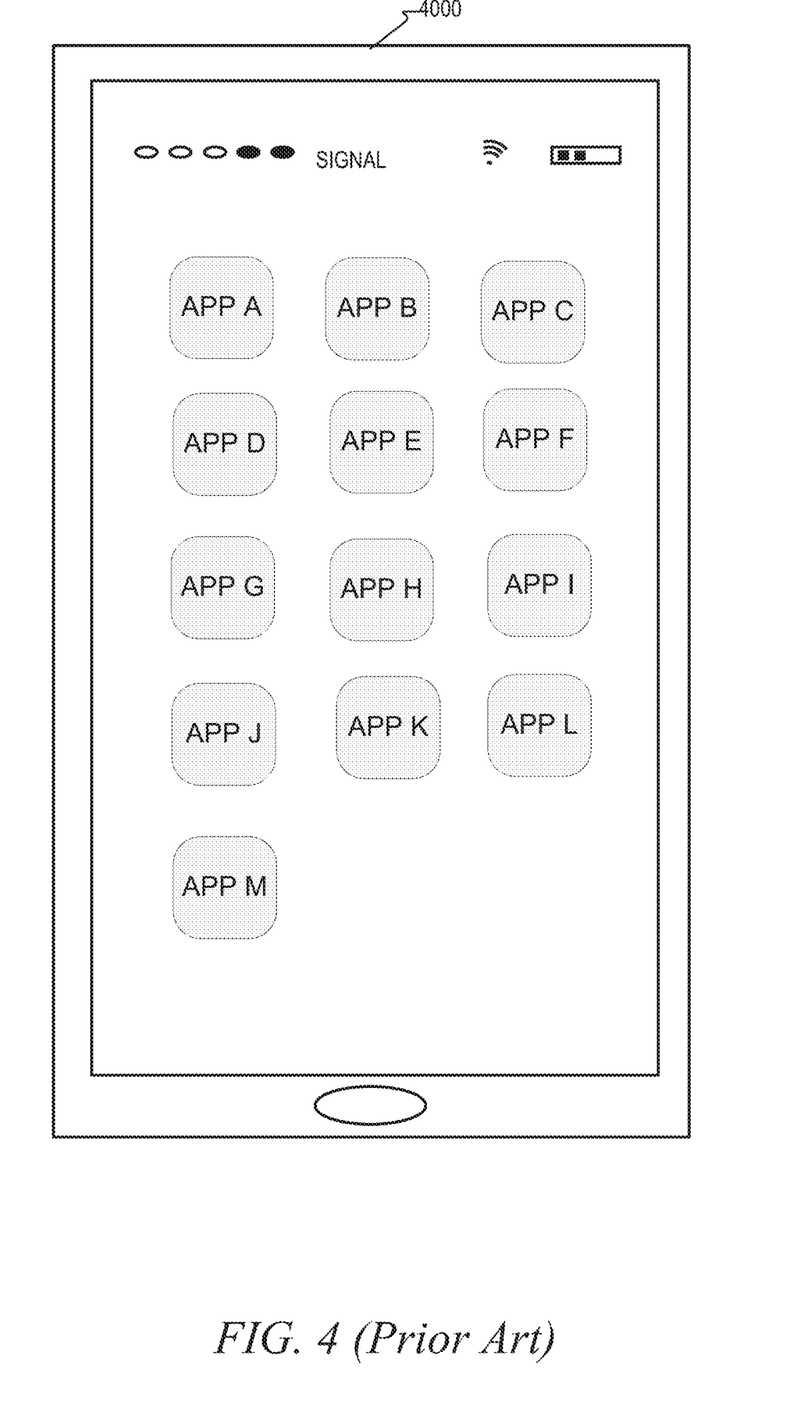
FIG. 4 is an example of a prior art mobile device.

Users often have multiple mobile wallets in the same computing device such as a mobile device. Each of these mobile wallets may have its own password (e.g., alphanumeric passwords, PINS, biometric authentication such as a fingerprint, multi-factor authentication, etc.) required to be provided prior to activating the mobile wallet. As the number of mobile wallets on a computing device increases, accessing and/or using the mobile wallets becomes increasingly challenging. On a mobile device, for example, icons for the mobile wallets may be difficult to find among other icons displayed on the device. Passwords may be difficult for a user to remember as well. FIG. 4 is an example of a prior art mobile device 4000 displaying multiple icons including a number of icons 4010-4080 for different mobile wallets. The screen illustrated in FIG. 4 may be just one of a number of similar screens available on the mobile device 4000.

The disclosure herein provides methods and systems for consolidating access to one or more mobile wallets within another mobile wallet application. For ease of reference, the other mobile wallet application may be referred to as a master mobile wallet application. The master mobile wallet application may, for example, display, in a user interface, a menu of one or more mobile wallets and receive a user selection of a particular mobile wallet to add to (e.g., consolidated within) the master mobile wallet. The added mobile wallet application may then be activated from within the master mobile wallet. This consolidation of mobile wallets within a master mobile wallet may make using the mobile wallets easier. The master wallet may further allow a user to store the password for the added wallet during setup and later activate the added mobile wallet using the stored password without requiring user input of the password during activation. Activation may include loading and executing an application and optionally providing a password and/or authenticating a user of the application. These are among other features of the examples provided herein.

Figure 1:
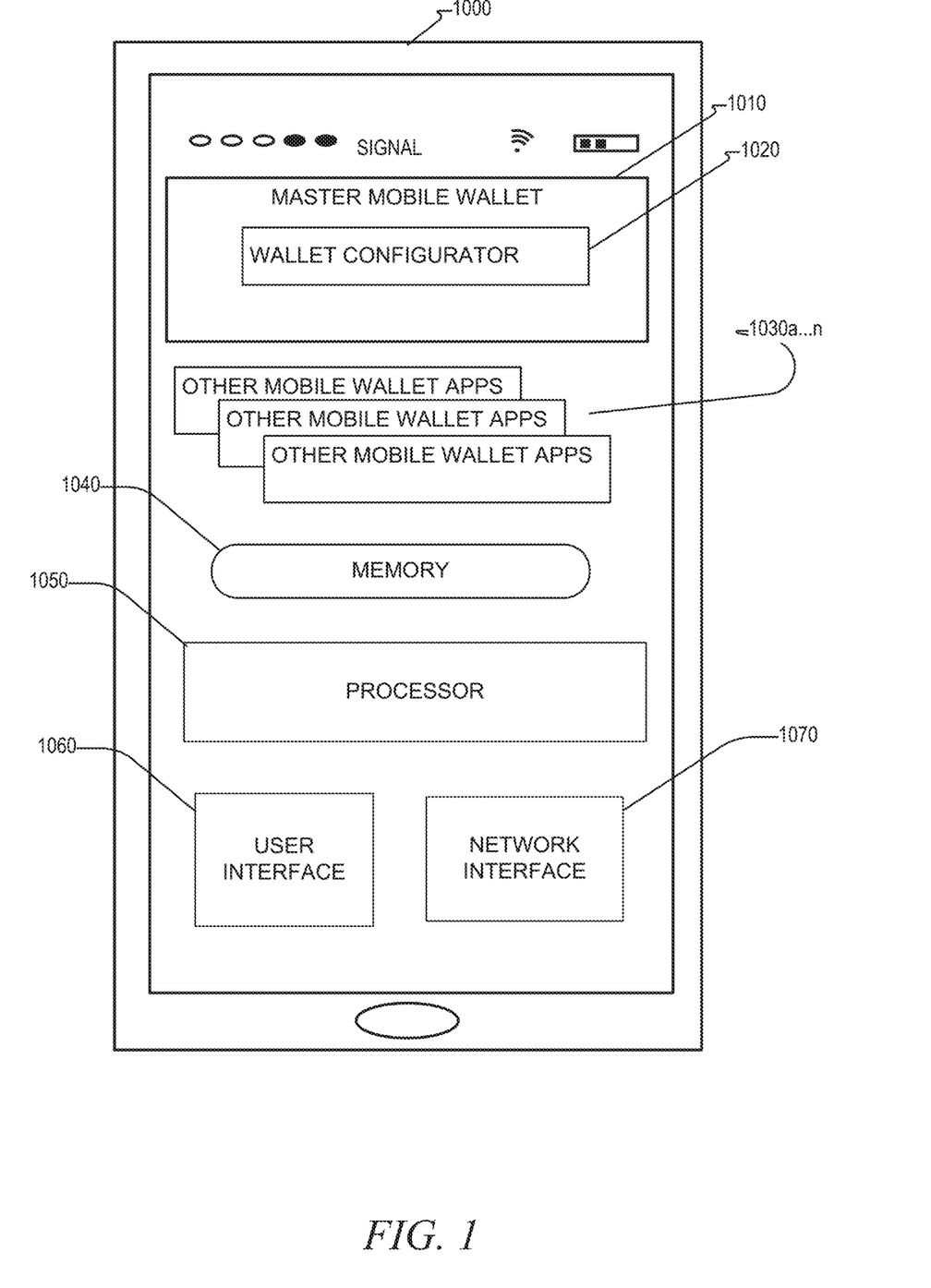
FIG. 1 is a block diagram illustrating a mobile computing device, according to an example embodiment.

FIG. 1 is a block diagram showing an example architecture of a mobile computing device 1000 that includes a master mobile wallet application 1010 (sometimes referred to as a master mobile wallet or master wallet for short) which may be used to access one or more other mobile wallets 1030$a$ . . . $n$. The master mobile wallet 1010 includes a wallet configurator 1020 that may add one or more of the other mobile wallet 1030$a$ . . . $n$ to the master mobile wallet 1010 so that a user may activate the added mobile wallets from within the master mobile wallet. For ease of reading, after a mobile wallet has been added to the master wall, the mobile wallet will be referred to as an added or consolidated mobile wallet. The wallet configurator 1020 may also be used to set the password requirements for activating an added mobile wallet. The wallet configurator may, for example, carry out the process flows of FIGS. 2 and 3.

The master mobile wallet 1010 and the other mobile wallets 1030$a$ . . . $n$ may each include one or more payment elements (e.g., credit cards, debit cards, etc.) and/or non-payment elements (e.g., insurance cards, driver's licenses, etc.) The master mobile wallet 1010 and the other mobile wallets 1030$a$ . . . $n$ may be stored on a memory 1040 accessible by a processor 1050. The processor 1050 may include one or more processors any of a variety of different types of commercially available processors suitable for mobile computing devices (for example, an Advanced RISC Machine (ARM) processor, an XScale architecture microprocessor, a Microprocessor without Interlocked Pipeline Stages (MIPS) architecture processor, or another type of processor). The mobile device 1000 may also include, among other things, a user interface 1060 such as a touch screen display and a network interface 1070 for communicating with a network. Memory 1040 may be a memory system, such as a Random Access Memory (RAM), a Flash memory, or other type of memory or data storage.

The network may be or comprise any suitable network environment operated according to any suitable network protocol. For example, one or more portions of network may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 2:
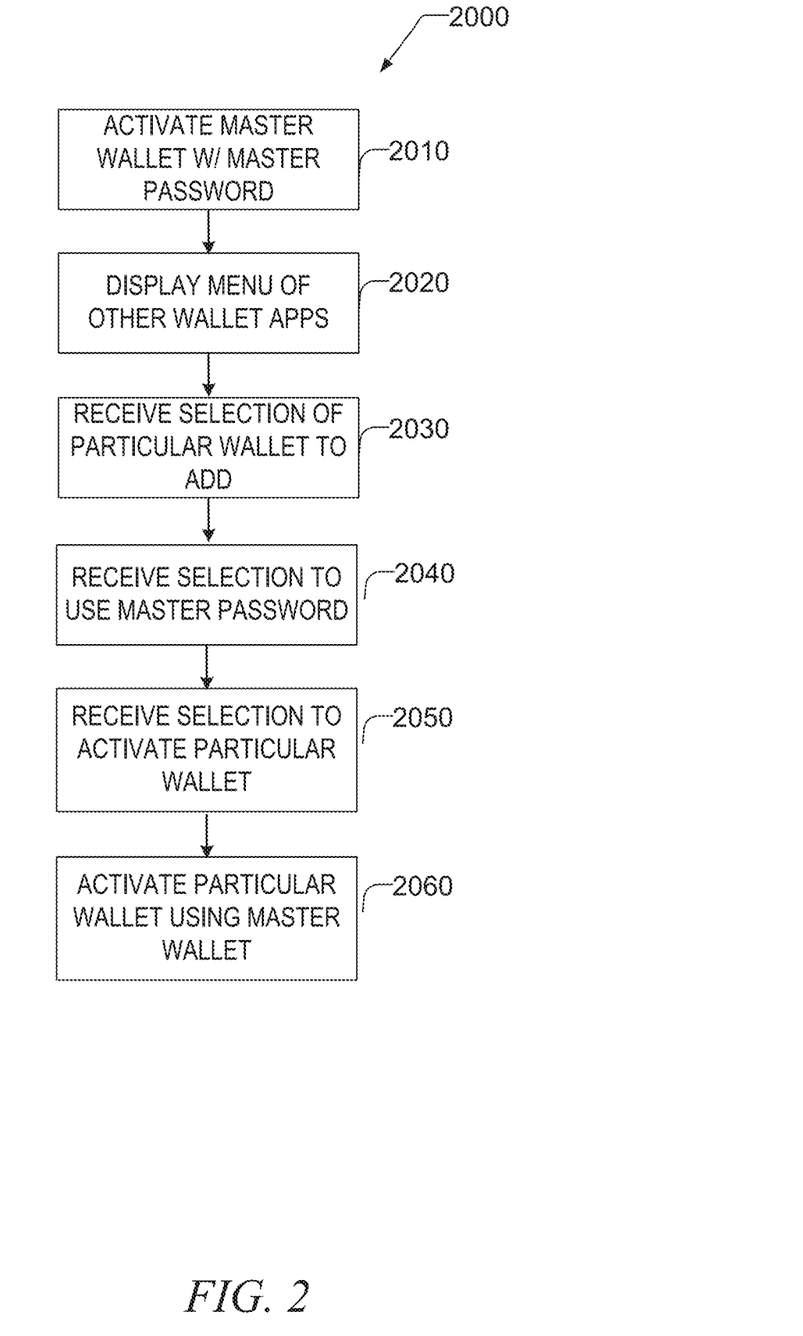
FIG. 2 is a flowchart showing application consolidation, according to an example embodiment.

FIG. 2 is a flowchart showing an example of a process flow 2000 that may be executed by a master wallet operating on a computing device such as a mobile device to consolidate access to other mobile wallet(s) within the master wallet. At 2010, the mobile device may activate the master mobile wallet application using a master password associated with the master mobile wallet application. The mobile device may display an icon associated with the master mobile wallet and receive a user selection of the icon to launch the master mobile wallet. The mobile device may then prompt the user to enter the master password. Upon receipt of the master password, the mobile device may activate the master mobile wallet.

At 2020, the master mobile wallet may display, in a user interface, a menu of one or more other mobile wallet applications also available on the computing device of the master wallet. To display the menu, the master wallet may retrieve data (e.g., wallet name) associated with the other mobile wallet(s) from a memory location of the computing device. The menu may be a drop-down list or a display of icon, for example. At 2030, the master mobile wallet receives from the menu a user selection of a particular mobile wallet application (or applications) to add to the master mobile wallet.

Figure 3:
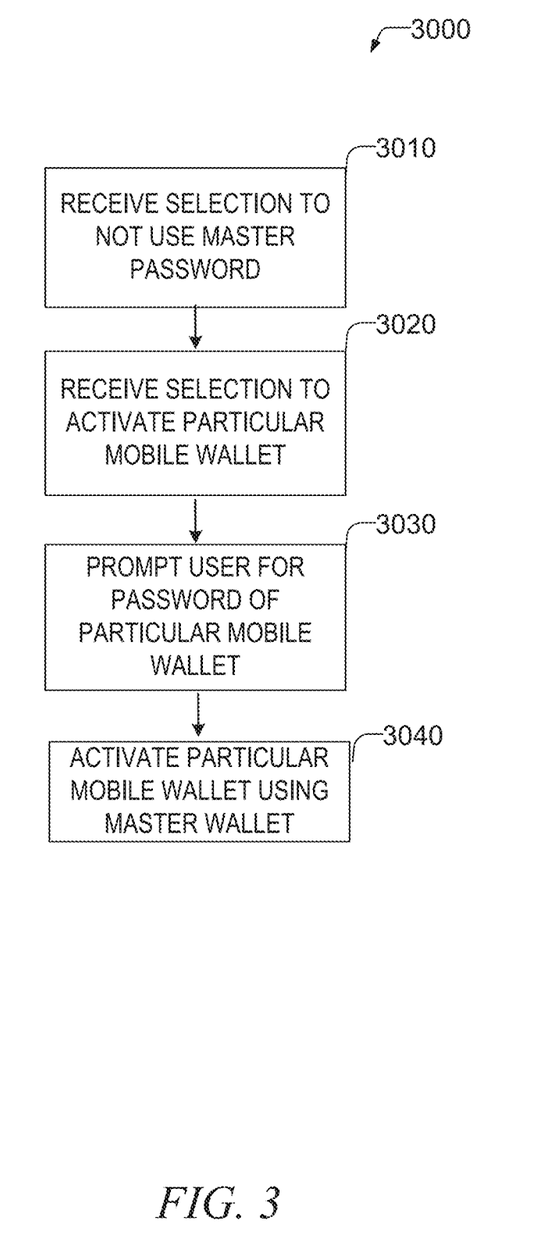
FIG. 3 is a flowchart showing application consolidation, according to an example embodiment.

At 2040, the master mobile wallet may receive a selection to use the master password (e.g., of the master wallet) for activating the particular mobile wallet selected at 2030. Alternatively, in some examples, the master mobile wallet may receive a selection to not use the master password for such activation in which case, process flow may continue as illustrated in FIG. 3 discussed below. Returning to 2040, the master mobile wallet may prompt the user for and receive the password for the particular mobile wallet to be added. This password may be set by the user and may be unique to the particular mobile wallet, and may be referred to as an individual password for the particular mobile wallet, to distinguish the password from the master password associated with the master wallet. In some cases, an added wallet may not have an individual password in which case a user may not enter one. As discussed further below, the master mobile wallet may use the individual password to activate the mobile wallet added to the master wallet.

After receiving the individual password, the master wallet may send the password to a wallet service provider associated with the master mobile wallet application for storage. The master wallet and its wallet service provider may securely communicate over a network. This may, for example, be done using communication schemes disclosed in U.S. patent application Ser. No. 15/264,531, filed Sep. 13, 2016, titled "Secure Digital Communications," the contents of which are herein incorporated by reference. In other examples, the master wallet may store the individual password locally in memory located on the computing device.

In some examples, the master wallet may receive user input to confirm the addition of the particular mobile wallet application to the master mobile wallet application (e.g., receiving user touch of a confirmation button). After adding the wallet to the master wallet, the master wallet may display an icon associated with the added mobile wallet application within a user interface of the master mobile wallet application. In some examples, the master wallet may remove or not display an icon for the added mobile wallet application in a main screen (e.g., one or more of a home screen, a primary display screen, or an application selection screen) of the mobile device after the mobile wallet has been added to the master wallet.

At 2050, after the mobile wallet has been added to the master mobile wallet (e.g., after receiving a password selection, the individual password for the wallet, and/or confirmation of the addition), the master wallet may receive a selection (e.g., user input or a request) to activate the added mobile wallet. This may be done by receiving a user's touch input of the added wallet's icon displayed within the master wallet, for example.

At 2060, after receiving the activation selection, the master mobile wallet may activate the added mobile wallet application using the master wallet application and without requiring user input of an individual password for the particular mobile wallet application during the activating. For example, the master wallet may request the individual password of the added mobile wallet from the wallet service provider and use the individual password to activate the added mobile wallet. Where the individual password is stored locally (e.g., in memory on the mobile device), the master wallet may access the memory to retrieve the individual password. The master mobile wallet may, for example, launch the added mobile wallet in a window of the master wallet or may launch the application in a separate window on the mobile device. After launching the added wallet, the master wallet may automatically present the retrieved individual password to the launched wallet application to activate the application. For example, the master wallet may simulate user input using an operating system Application Programming Interface such that it appears from the perspective of the wallet application that the user entered the individual password.

FIG. 3 is a flowchart showing an example of a process flow 3000 that allows a user to add a mobile wallet to the master wallet but opt not to use the master wallet password to activate an added mobile wallet. The process flow 3000 may follow from the selection of a mobile wallet to add to the master wallet at 2030. In the process flow 3000, at 3010, the master wallet may receive a selection from a user to not use the master password for activating the selected mobile wallet application. The master wallet may also receive a user input confirming the addition of the selected mobile wallet.

At 3020, the master wallet may receive a selection (e.g., request or user input) to activate the added mobile wallet application. After receiving this selection, at 3030, the master wallet may prompt the user to enter the individual password for the mobile wallet application. After receiving the individual password, the master wallet may activate the added mobile wallet using the individual password at 3040. This may be done by launching the mobile wallet within the master wallet or in a separate window on the mobile device, and presenting the launched mobile wallet with the individual password entered by the user.

After adding mobile wallet application(s) to the master wallet (e.g., after receiving the selection to add a mobile wallet and/or after confirmation of the selection to add), the master wallet may display a screen that includes icons for the master wallet and the added mobile wallet(s). The icon for the master wallet may be located in different window than icon(s) for the added mobile wallet(s). The icons may be used to select the corresponding mobile wallet. Upon selection, the master wallet may display content associate the wallet corresponding to the selected icon within a display window of the master wallet.

Figure 5:
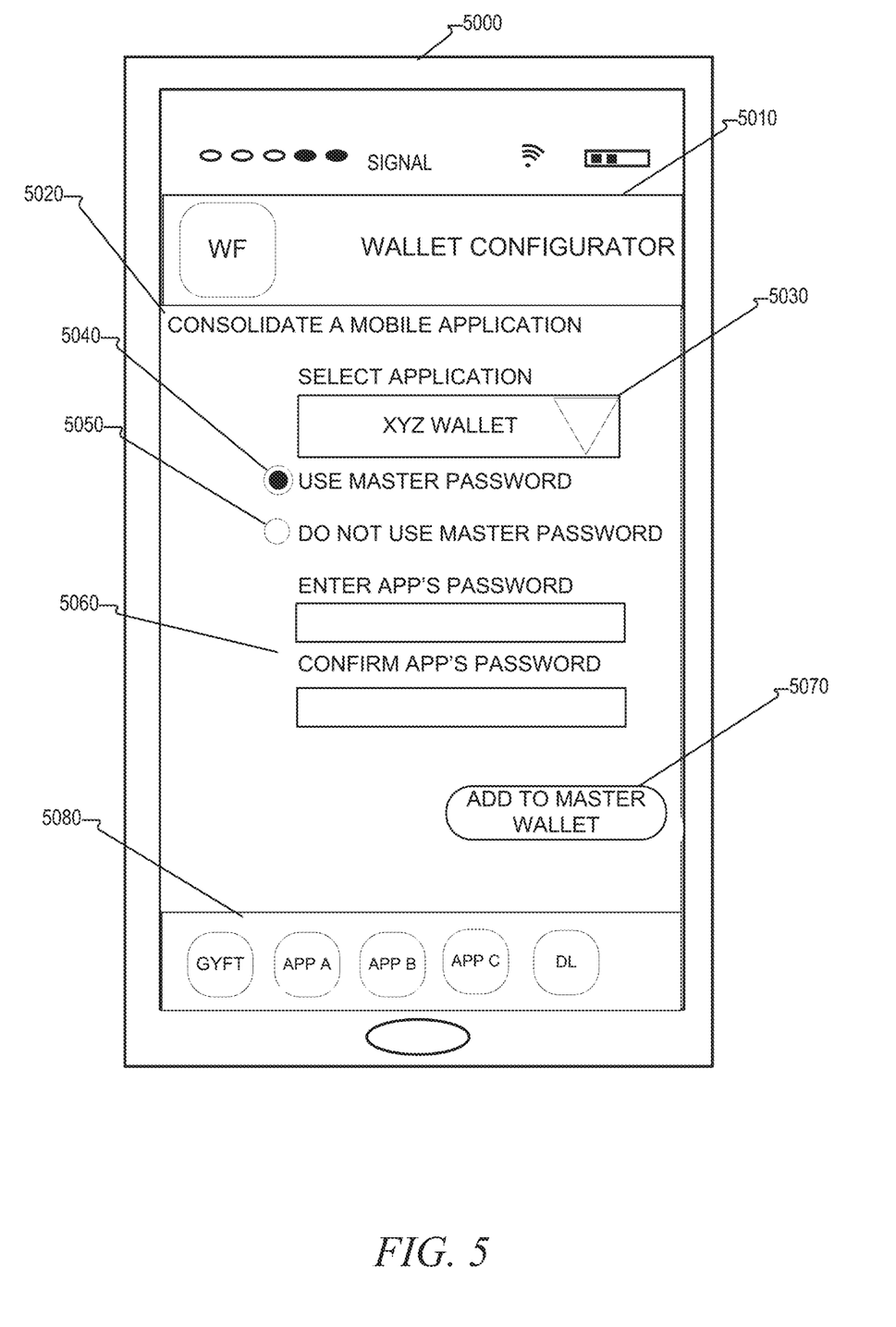
FIG. 5 is an example of a wallet configurator, according to an example embodiment.

An icon may be any type of input including a graphical or text symbol. FIG. 5 is an example of a wallet configurator 5010 operating on a mobile device 5000. The wallet configurator 5010 may for example carry out portions of the process flow illustrated in FIGS. 2 and 3. The wallet configurator 5010 may be opened in an associated master mobile wallet and may allow a user to consolidate other mobile wallets under the master wallet. The wallet configurator 5010 may present a list of mobile wallet applications in a pull down menu 5030 and receive user input choosing one to add to the master wallet, in this case the XYZ wallet. If XYZ wallet has a password to open, the user may choose to use a master password by selecting button 5040 or may choose not to use the master password by selecting button 5050. The master password may be a password used to open the master wallet. If the wallet configurator 5010 receives input to use the master password, it may receive the individual password for the XYZ wallet and confirm the password through inputs 5060.

The wallet configurator 5010 may store the XYZ password securely either locally or remotely, and the master wallet may use the XYZ password to open XYZ wallet automatically without requiring a user to enter the XYZ wallet password during activation of the XYZ wallet. The wallet configurator 5010 may include a confirmation button 570 that a user may touch to add to the XYZ wallet (selected using input from menu 5030) to the master wallet. The wallet configurator 5010 may show the newly added mobile wallet application at the bottom 5080 of the display when the process is complete. In some examples, when an application is consolidated within a master wallet, the master wallet may present the user with an option to leave the application's icon available on a main screen of the mobile device or delete it from the screen.

Figure 6:
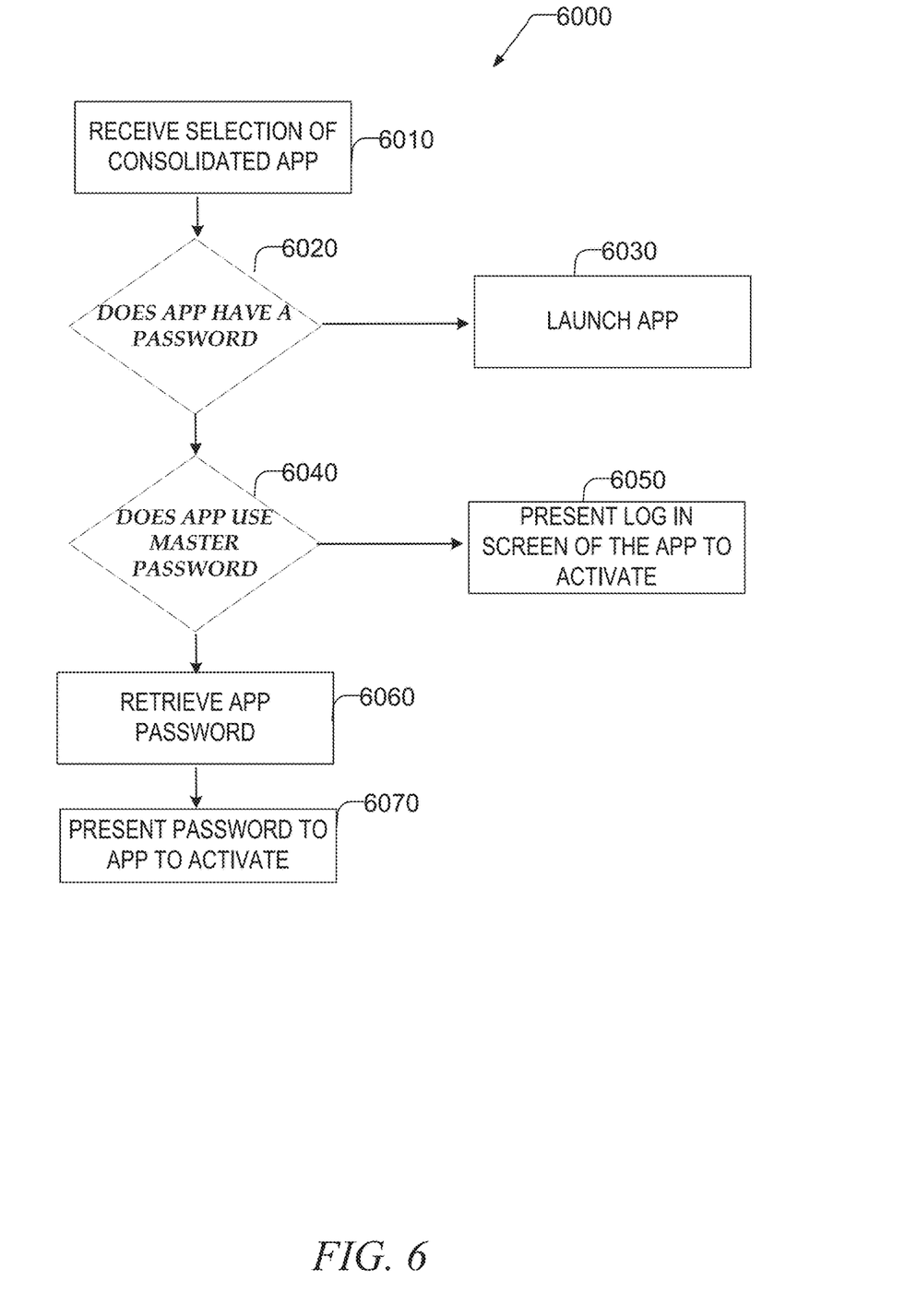
FIG. 6 is a flowchart showing activation of a consolidated application, according to an example embodiment.

FIG. 6 is a flowchart showing an example of a process flow 6000 for opening a consolidated application. At 6010, a mobile wallet may receive input (e.g., a touch input from a user) selecting an application consolidated in a master wallet. The master wallet may determine if the selected application needs a password at 6020. If it does, the master wallet may determine if the application uses the master password at 6040. If the application does not need a password, the master wallet may launch and activate the application at 6030. In this way, a user may then submit the selected application (consolidated within the master wallet) to a reader (e.g., point of sale device) without entering a password for the selected application. If the application uses the master password, the master wallet may retrieve the application's password from its service provider in a secure manner at 6060 and present the application's password to activate the application at 6070. Alternatively, the password may retrieved from local storage. If the consolidated app does not use the master password, the master wallet may present a log in screen to the user so that the user can enter the password manually at 6050.

Figure 7:
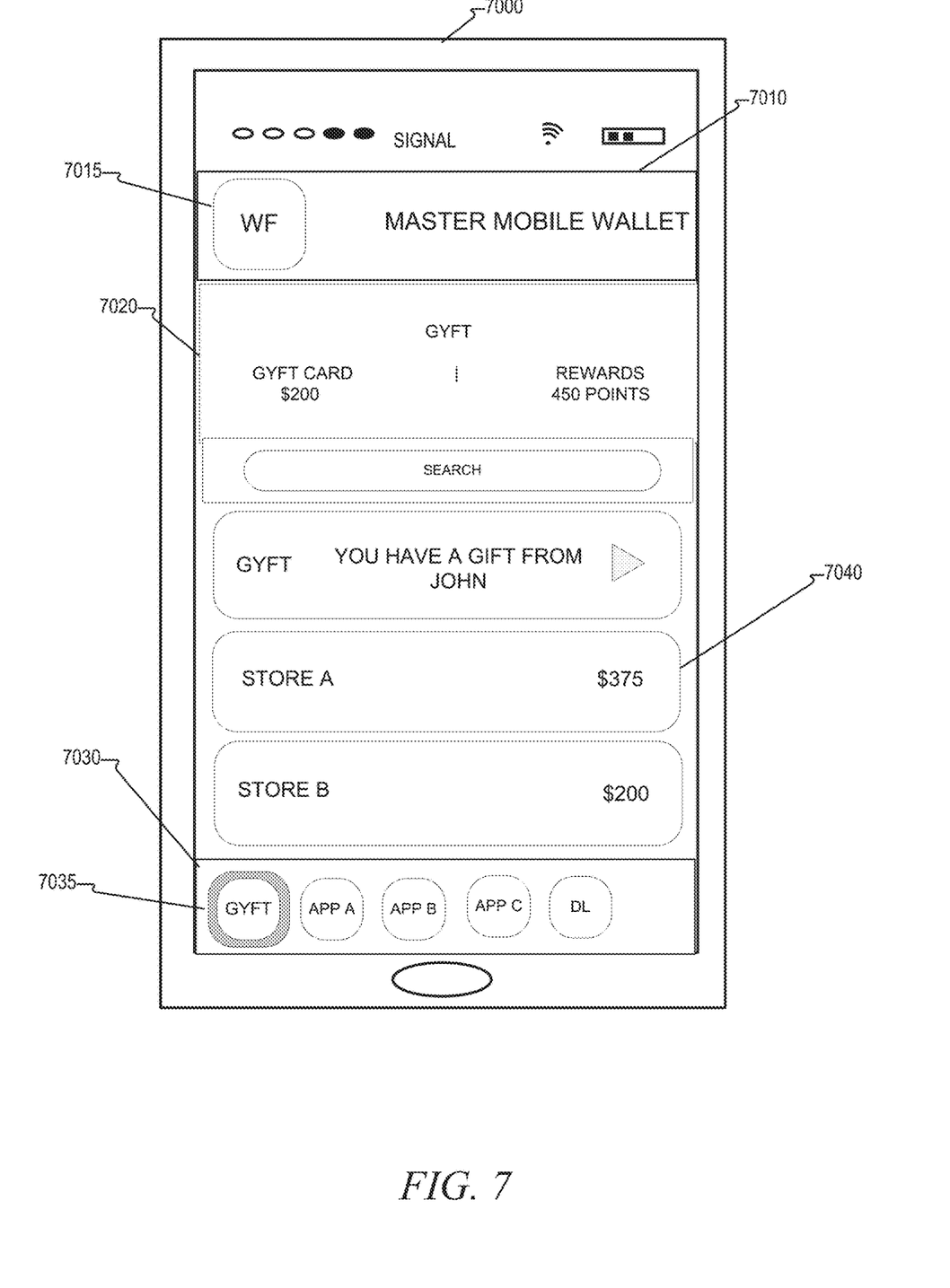
FIG. 7 is an example of a master wallet interface on a mobile device, according to an example embodiment.

FIG. 7 is an example of a master wallet 7010 operating on a mobile device 7000 and having access to a number of consolidated applications. The master wallet 7010 may display icons for consolidated applications in the bottom display area 7030. The master wallet 7010 may display icons for payment elements and non-payment elements (e.g., the illustrated driver's license (DL)) in the bottom display area 7030 of the master wallet's user interface. When the master wallet 7010 receives user input (e.g., a touch) selecting one of the applications, the icon may be highlighted in the display area 7030 and its content (e.g., item 7040) may be displayed in the primary window 7020 of the master wallet 7010. In the illustrated example, the Gyft icon 7035 is highlighted and the content of the Gyft wallet application is shown in the primary window 7020. The primary window 7020 may display the selected application (e.g., Gyft app) in the same way the Gyft app displays on the main screen of the phone if selected outside of the master wallet. In other case, the master wallet 7010 may open the selected application in its own screen (not shown). If the user selects a different icon, the master wallet 7010 may show the content of the selected application in the primary window 7020 of the master wallet accordingly. If the master wallet 7010 receives a selection of the master wallet icon 7015, the master wallet 7010 content may be displayed in the window 7020.

The master wallet 7010 may present the set of applications at the bottom display area 7030 based on past usage history, environmental data, or other conditions if there are more applications than can be displayed in the display area 7030. For instance the master wallet 7010 may present a set (e.g., five) applications that are frequently used at a location (e.g., a shopping mall identified based on GPS data), a set of applications that have been frequently used in the past associated with the last purchase, or simply last set of applications used recently.

In some examples, a consolidated application may be activated after its icon is selected. In other examples, the display area 7030 may present icon(s) for application(s) that have already been activated by the master wallet using the process flows described above. While the master wallet may allow activation of an application consolidated within the master wallet, in some example, a mobile device may still allow a user to activate the application from outside of the master wallet, for example, through selecting the application in a main screen of the mobile device and entering any required password.

While mobile wallet applications are illustrated above, the type of application that can be added to a master wallet (e.g., by a wallet configurator) may be any application stored on the mobile device. For example, an online banking application may be added to a master wallet and an online banking web page may be opened thorough the master wallet without requiring a user to enter the password of for the banking app during activation. In one embodiment, the master wallet may be used to retrieve passwords by allowing a user to search for and retrieve password(s) of consolidated application(s) included in the master wallet.

Figure 8:
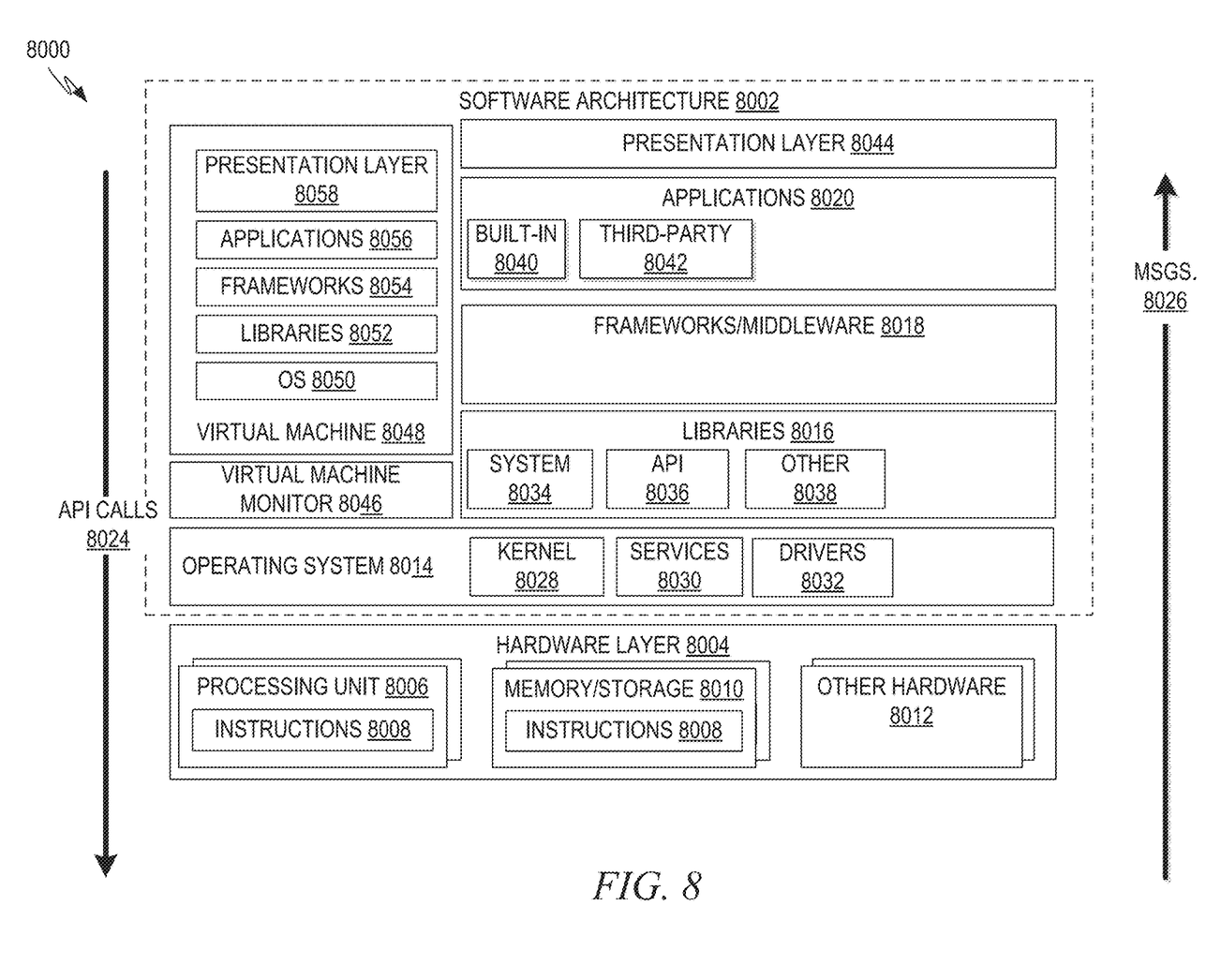
FIG. 8 is a block diagram showing an example of a software architecture for a computing device.

FIG. 8 is a block diagram 8000 showing one example of a software architecture 8002 for a computing device. The architecture 8002 maybe used in conjunction with various hardware architectures, for example, as described herein. FIG. 8 is merely a non-limiting example of a software architecture 8002 and many other architectures may be implemented to facilitate the functionality described herein. A representative hardware layer 8004 is illustrated and can represent, for example, any of the above referenced computing devices. In some examples, the hardware layer 8004 may be implemented according to the architecture 9000 of FIG. 9.

The representative hardware layer 8004 comprises one or more processing units 8006 having associated executable instructions 8008. Executable instructions 8008 represent the executable instructions of the software architecture 8002, including implementation of the methods, modules, components, and so forth discussed herein. Hardware layer 8004 also includes memory and/or storage modules 8010, which also have executable instructions 8008. Hardware layer 8004 may also comprise other hardware as indicated by other hardware 8012, which represents any other hardware of the hardware layer 8004, such as the other hardware illustrated as part of hardware architecture 700.

In the example architecture of FIG. 8, the software architecture 8002 may be conceptualized as a stack of layers where each layer provides particular functionality. For example, the software architecture 8002 may include layers such as an operating system 8014, libraries 8016, frameworks/middleware 8018, applications 8020, and presentation layer 8044. Operationally, the applications 8020 and/or other components within the layers may invoke application programming interface (API) calls 8024 through the software stack and receive a response, returned values, and so forth illustrated as messages 8026 in response to the API calls 8024. The layers illustrated are representative in nature and not all software architectures have all layers. For example, some mobile or special purpose operating systems may not provide a frameworks/middleware layer 8018, while others may provide such a layer. Other software architectures may include additional or different layers.

The operating system 8014 may manage hardware resources and provide common services. The operating system 8014 may include, for example, a kernel 8028, services 8030, and drivers 8032. The kernel 8028 may act as an abstraction layer between the hardware and the other software layers. For example, the kernel 8028 may be responsible for memory management, processor management (e.g., scheduling), component management, networking, security settings, and so on. The services 8030 may provide other common services for the other software layers. In some examples, the services 8030 include an interrupt service. The interrupt service may detect the receipt of a hardware or software interrupt and, in response, cause the architecture 8002 to pause its current processing and execute an ISR when an interrupt is received. The ISR may generate the alert, for example, as described herein.

The drivers 8032 may be responsible for controlling or interfacing with the underlying hardware. For instance, the drivers 8032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 8016 may provide a common infrastructure that may be utilized by the applications 8020 and/or other components and/or layers. The libraries 8016 typically provide functionality that allows other software modules to perform tasks in an easier fashion than to interface directly with the underlying operating system 8014 functionality (e.g., kernel 8028, services 8030 and/or drivers 8032). The libraries 8016 may include system libraries 8034 (e.g., C standard library) that may provide functions such as memory allocation functions, string manipulation functions, mathematic functions, and the like. In addition, the libraries 8016 may include API libraries 8036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 8016 may also include a wide variety of other libraries 8038 to provide many other APIs to the applications 8020 and other software components/modules.

The frameworks 8018 (also sometimes referred to as middleware) may provide a higher-level common infrastructure that may be utilized by the applications 8020 and/or other software components/modules. For example, the frameworks 8018 may provide various GUI functions, high-level resource management, high-level location services, and so forth. The frameworks 8018 may provide a broad spectrum of other APIs that may be utilized by the applications 8020 and/or other software components/modules, some of which may be specific to a particular operating system or platform.

The applications 8020 include built-in applications 8040 and/or third-party applications 8042. Examples of representative built-in applications 8040 may include, but are not limited to, a contacts application, a browser application, a book reader application, a location application, a media application, a messaging application, and/or a game application. Third-party applications 8042 may include any of the built-in applications 8040 as well as a broad assortment of other applications. In a specific example, the third-party application 8042 (e.g., an application developed using the Android™ or iOS™ software development kit (SDK) by an entity other than the vendor of the particular platform) may be mobile software running on a mobile operating system such as iOS™, Android™, Windows® Phone, or other user computing device operating systems. In this example, the third-party application 8042 may invoke the API calls 8024 provided by the mobile operating system such as operating system 8014 to facilitate functionality described herein.

The applications 8020 may utilize built-in operating system functions (e.g., kernel 8028, services 8030 and/or drivers 8032), libraries (e.g., system 8034, APIs 8036, and other libraries 8038), frameworks/middleware 8018 to create user interfaces to interact with users of the system. Alternatively, or additionally, in some systems, interactions with a user may occur through a presentation layer, such as presentation layer 8044. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 8, this is illustrated by virtual machine 8048. A virtual machine creates a software environment where applications/modules can execute as if they were executing on a hardware computing device. A virtual machine is hosted by a host operating system (operating system 8014) and typically, although not always, has a virtual machine monitor 8046, which manages the operation of the virtual machine 8048 as well as the interface with the host operating system (i.e., operating system 8014). A software architecture executes within the virtual machine 8048 such as an operating system 8050, libraries 8052, frameworks/middleware 8054, applications 8056, and/or presentation layer 8058. These layers of software architecture executing within the virtual machine 8048 can be the same as corresponding layers previously described or may be different.

Figure 9:
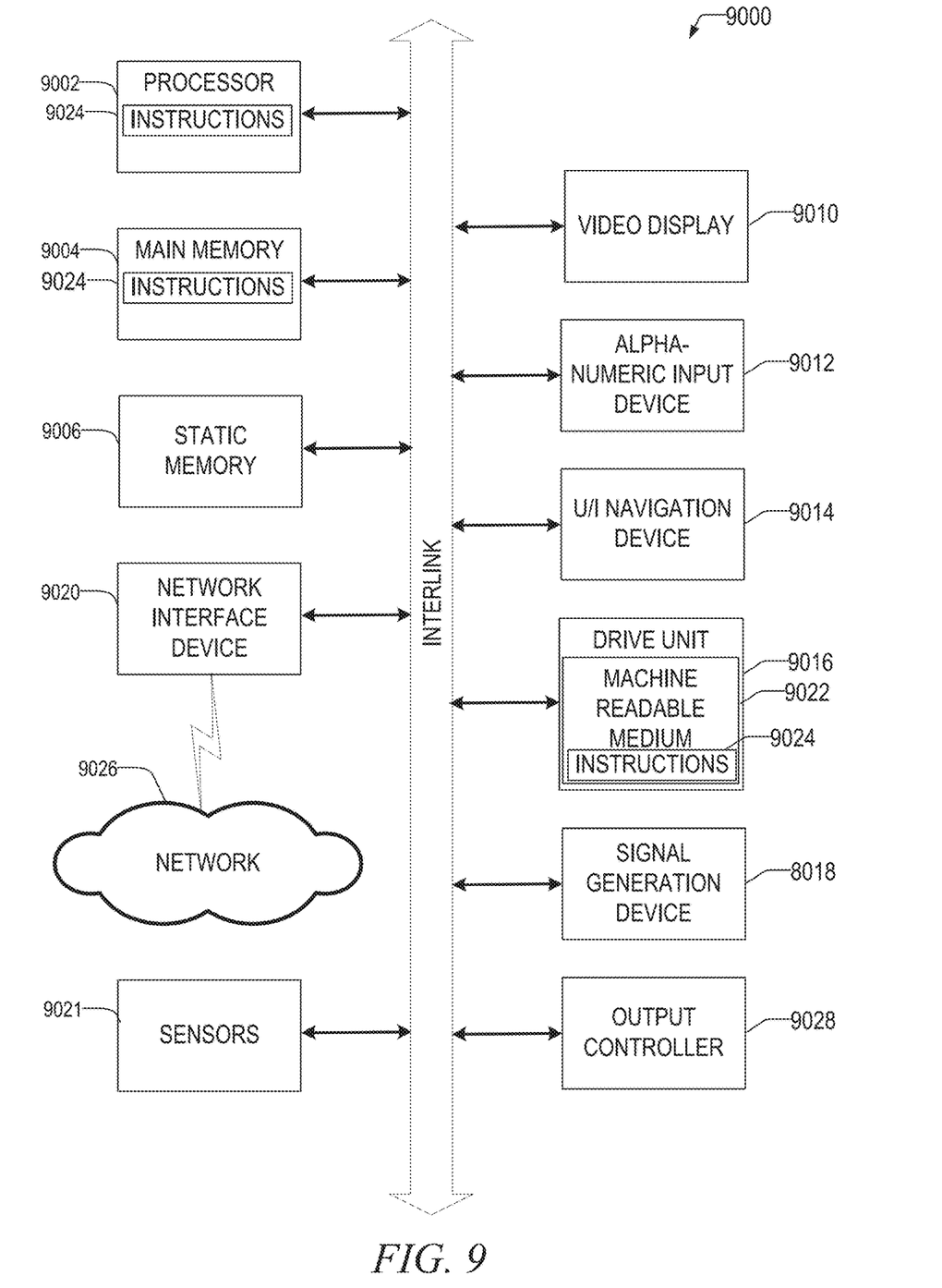
FIG. 9 is a block diagram illustrating a computing device hardware architecture, within which a set or sequence of instructions can be executed to cause the machine to perform examples of any one of the methodologies discussed herein.

FIG. 9 is a block diagram illustrating a computing device hardware architecture 9000, within which a set or sequence of instructions can be executed to cause the machine to perform examples of any one of the methodologies discussed herein. For example, the architecture 9000 may execute the software architecture 8002 described with respect to FIG. 8. The architecture 9000 may operate as a standalone device or may be connected (e.g., networked) to other machines. In a networked deployment, the architecture 9000 may operate in the capacity of either a server or a client machine in server-client network environments, or it may act as a peer machine in peer-to-peer (or distributed) network environments. The architecture 9000 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 9000 includes a processor unit 9002 comprising at least one processor (e.g., a central processing unit (CPU), a graphics processing unit (GPU) or both, processor cores, compute nodes, etc.). The architecture 9000 may further comprise a main memory 9004 and a static memory 9006, which communicate with each other via a link 9008 (e.g., bus). The architecture 9000 can further include a video display unit 9010, an alphanumeric input device 9012 (e.g., a keyboard), and a UI navigation device 9014 (e.g., a mouse). In some examples, the video display unit 9010, input device 9012, and UI navigation device 9014 are incorporated into a touch screen display. The architecture 9000 may additionally include a storage device 9016 (e.g., a drive unit), a signal generation device 9018 (e.g., a speaker), a network interface device 9020, and one or more sensors 9021, such as a GPS sensor, compass, accelerometer, or other sensor.

In some examples, the processor unit 9002 or other suitable hardware component may support a hardware interrupt. In response to a hardware interrupt, the processor unit 9002 may pause its processing and execute an ISR, for example, as described herein.

The storage device 9016 includes a machine-readable medium 9022 on which is stored one or more sets of data structures and instructions 9024 (e.g., software) embodying or utilized by any one or more of the methodologies or functions described herein. The instructions 9024 can also reside, completely or at least partially, within the main memory 9004, static memory 9006, and/or within the processor unit 9002 during execution thereof by the architecture 9000, with the main memory 9004, static memory 9006, and the processor unit 9002 also constituting machine-readable media. Instructions stored at the machine-readable medium 9022 may include, for example, instructions for implementing the software architecture 8002, instructions for executing any of the features described herein, etc.

While the machine-readable medium 9022 is illustrated in an example to be a single medium, the term "machine-readable medium" can include a single medium or multiple media (e.g., a centralized or distributed database, and/or associated caches and servers) that store the one or more instructions 9024. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 9024 can further be transmitted or received over a communications network 9026 using a transmission medium via the network interface device 9020 utilizing any one of a number of well-known transfer protocols (e.g., HTTP). Examples of communication networks include a LAN, a WAN, the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for accessing one or more mobile wallet applications using a master mobile wallet application executing on one or more processors of a computing device, the method comprising:
   activating the master mobile wallet application using a master password associated with the master mobile wallet application;
   displaying, in a user interface of the master mobile wallet application, a menu of the one or more mobile wallet applications;
   receiving from the menu a user selection of a particular mobile wallet application to add to the master mobile wallet application;
   receiving a password selection to use the master password for activating the particular mobile wallet application;
   after the password selection, receiving an activation selection to activate the particular mobile wallet application; and
   after the activation selection, activating the particular mobile wallet application using the master mobile wallet application and without requiring user input of an individual password for the particular mobile wallet application during the activating.

2. The method of claim 1, further including displaying an icon of the particular mobile wallet application within a display of the master mobile wallet application.

3. The method of claim 1, further including receiving the individual password for the particular mobile wallet application after receiving the password selection and before the activation selection.

4. The method of claim 3, further including sending the individual password of the particular mobile wallet application to a wallet service provider associated with the master mobile wallet application.

5. The method of claim 4, where activating the particular mobile wallet application includes receiving the individual password of the particular mobile wallet application from the wallet service provider and using the individual password to activate the particular mobile wallet application without requiring user input of the individual password during the activating.

6. The method of claim 1, further including removing the particular mobile wallet application from a main screen of a mobile device after receiving the user selection to add the particular mobile wallet application to the master mobile wallet application.

7. The method of claim 1, further including:
   receiving from the menu a selection of a second particular mobile wallet application to add to the master mobile wallet application;
   receiving a selection to not use the master password for activating the second particular mobile wallet application;
   receiving a selection to activate the second particular mobile wallet application; and
   after receiving the selection to activate the second particular mobile wallet application, prompting the user to enter an individual password for the second particular mobile wallet application and activating the second particular mobile wallet application using the individual password.

8. The method of claim 1, further including receiving user input to add the particular mobile wallet application to the master mobile wallet application and thereafter displaying an icon associated with the particular mobile wallet application within a user interface of the master mobile wallet application.

9. The method of claim 1, wherein displaying includes retrieving data associated with the one or more mobile wallet applications from a memory location of the computing device.

10. The method of claim 1, further including, after receiving the user selection to add the particular mobile wallet application, displaying a screen of the master mobile wallet application, the screen including a first icon for selecting the master mobile wallet application and a second icon for selecting the particular mobile wallet application.

11. The method of claim 10, further including receiving a selection of the second icon and displaying, in a window of the master mobile wallet application, content related to the particular mobile wallet application.

12. A non-transitory computer-readable storage medium including instructions, for accessing one or more mobile wallet applications using a master mobile wallet application, that when executed by a computer, cause the computer to perform operations of:
   activating the master mobile wallet application using a master password associated with the master mobile wallet application;
   displaying, in a user interface of the master mobile wallet application, a menu of the one or more mobile wallet applications;
   receiving from the menu a user selection of a particular mobile wallet application to add to the master mobile wallet application;
   receiving a password selection to use the master password for activating the particular mobile wallet application;
   after the password selection, receiving an activation selection to activate the particular mobile wallet application; and
   after the activation selection, activating the particular mobile wallet application using the master wallet application and without requiring user input of an individual password for the particular mobile wallet application during the activating.

13. The non-transitory computer-readable storage medium of claim 12 wherein the operations further include receiving the individual password for the particular mobile wallet application after receiving the password selection and before the activation selection; and
   sending the individual password of the particular mobile wallet application to a wallet service provider associated with the master mobile wallet application.

14. The non-transitory computer-readable storage medium of claim 13, wherein activating the particular mobile wallet application includes receiving the individual password of the particular mobile wallet application from the wallet service provider and using the individual password to activate the particular mobile wallet application without requiring user input of the individual password during the activating.

15. The non-transitory computer-readable storage medium of claim 12 wherein the operations further include:
   receiving from the menu a selection of a second particular mobile wallet application to add to the master mobile wallet application;
   receiving a selection to not use the master password for activating the second particular mobile wallet application;
   receiving a selection to activate the second particular mobile wallet application; and after receiving the selection to activate the second particular mobile wallet application, prompting the user to enter an individual password for the second particular mobile wallet application and activating the second particular mobile wallet application using the individual password.

16. A system for accessing one or more mobile wallet applications using a master mobile wallet application, the system comprising:
at least one processor; and
at least one storage device comprising instructions, which when executed by the at least one processor, configure to at least one processor to perform operations comprising:
activating the master mobile wallet application using a master password associated with the master mobile wallet application;
displaying, in a user interface of the master mobile wallet application, a menu of the one or more mobile wallet applications;
receiving from the menu a user selection of a particular mobile wallet application to add to the master mobile wallet application;
receiving a password selection to use the master password for activating the particular mobile wallet application;
after the password selection, receiving an activation selection to activate the particular mobile wallet application; and
after the activation selection, activating the particular mobile wallet application using the master wallet application and without requiring user input of an individual password for the particular mobile wallet application during the activating.

17. The system of claim 16, wherein the operations further include:

receiving from the menu a selection of a second particular mobile wallet application to add to the master mobile wallet application;
receiving a selection to not use the master password for activating the second particular mobile wallet application;
receiving a selection to activate the second particular mobile wallet application; and
after receiving the selection to activate the second particular mobile wallet application, prompting the user to enter an individual password for the second particular mobile wallet application and activating the second particular mobile wallet application using the individual password.

18. The system of claim 17, where activating the particular mobile wallet application includes receiving the individual password of the particular mobile wallet application from a wallet service provider and using the individual password to activate the particular mobile wallet application without requiring user input of the individual password during the activating.

19. The system of claim 17, further including, after receiving the selection to add the particular mobile wallet application and after receiving the selection to add the second particular mobile wallet application, displaying a screen of the master mobile wallet application, the screen including a first icon for selecting the master wallet application, a second icon for selecting the particular mobile wallet application, and a third icon for selecting the second particular mobile wallet application.

20. The system of claim 19, further including receiving a user selection of one of the first, second or third icon and displaying in a window of the master mobile wallet application, content related to a wallet application associated with the selected one icon.

* * * * *

UNITED STATES PATENT AND TRADEMARK OFFICE
CERTIFICATE OF CORRECTION

PATENT NO. : 10,776,777 B1
APPLICATION NO. : 15/669460
DATED : September 15, 2020
INVENTOR(S) : Joon Maeng Page 1 of 1

It is certified that error appears in the above-identified patent and that said Letters Patent is hereby corrected as shown below:

On the Title Page

On page 2, in Column 2, under "Other Publications", Line 5, delete "Alllowance" and insert --Allowance-- therefor On page 2, in Column 2, under "Other Publications", Line 15, delete "Alllowance" and insert --Allowance-- therefor Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*